United States Patent [19]
Gonidec et al.

[11] Patent Number: 5,893,265
[45] Date of Patent: Apr. 13, 1999

[54] PIVOTING DOOR THRUST REVERSER WITH DEFLECTING VANE

[75] Inventors: Patrick Gonidec, Sainte Adresse; Guy Bernard Vauchel, Le Havre, both of France

[73] Assignee: Société Hispano-Suiza, Paris, France

[21] Appl. No.: 08/853,935

[22] Filed: May 9, 1997

[30] Foreign Application Priority Data

May 9, 1996 [FR] France ................... 96 05763

[51] Int. Cl.[6] ............................................. F02K 3/02
[52] U.S. Cl. ................... 60/226.2; 60/230; 239/265.33; 244/110 B
[58] Field of Search ................ 60/226.2, 230, 60/262; 239/265.33, 265.37; 244/110 B

[56] References Cited

U.S. PATENT DOCUMENTS

| | | |
|---|---|---|
| 3,279,182 | 10/1966 | Helmintoller . |
| 3,605,411 | 9/1971 | Maison et al. . |
| 3,739,582 | 6/1973 | Maison ................... 60/226.2 |
| 4,894,985 | 1/1990 | Dubois et al. ............ 60/226.2 |
| 5,039,171 | 8/1991 | Lore . |
| 5,297,387 | 3/1994 | Carimali et al. . |
| 5,671,598 | 9/1997 | Standish ................. 60/226.2 |
| 5,765,362 | 6/1998 | Gonidec et al. ......... 60/226.2 |

FOREIGN PATENT DOCUMENTS

| | | |
|---|---|---|
| 413635 | 2/1991 | European Pat. Off. . |
| 1482538 | 5/1967 | France . |
| 2030034 | 10/1970 | France . |
| 2618853 | 2/1989 | France . |
| 2680547 | 2/1993 | France . |

*Primary Examiner*—Charles G. Freay
*Attorney, Agent, or Firm*—Bacon & Thomas, PLLC

[57] ABSTRACT

The present invention relates to a thrust reverser for a turbojet engine having a cowling bounding a flow duct through which gases flow from the front of the cowling towards a rear of the cowling, the cowling having at least one reverse thrust opening communicating with the gas flow duct. The thrust reverser has a thrust reverser door pivotally mounted on the cowling so as to be movable between a forward and a thrust position, wherein the thrust reverser door covers the reverse thrust opening, and a reverse thrust position wherein the thrust reverser door uncovers the reverse thrust opening and directs at least a portion of the gases flowing through the gas flow duct outwardly through the reverse thrust opening. A vane having an air foil cross-sectional configuration is connected to the thrust reverser door and is located so as to be acted on by the gases passing through the gas flow duct when the thrust reverser door is adjacent to its forward thrust position, such that the vane exerts a force on the thrust reverser door urging it toward its forward thrust position.

21 Claims, 12 Drawing Sheets

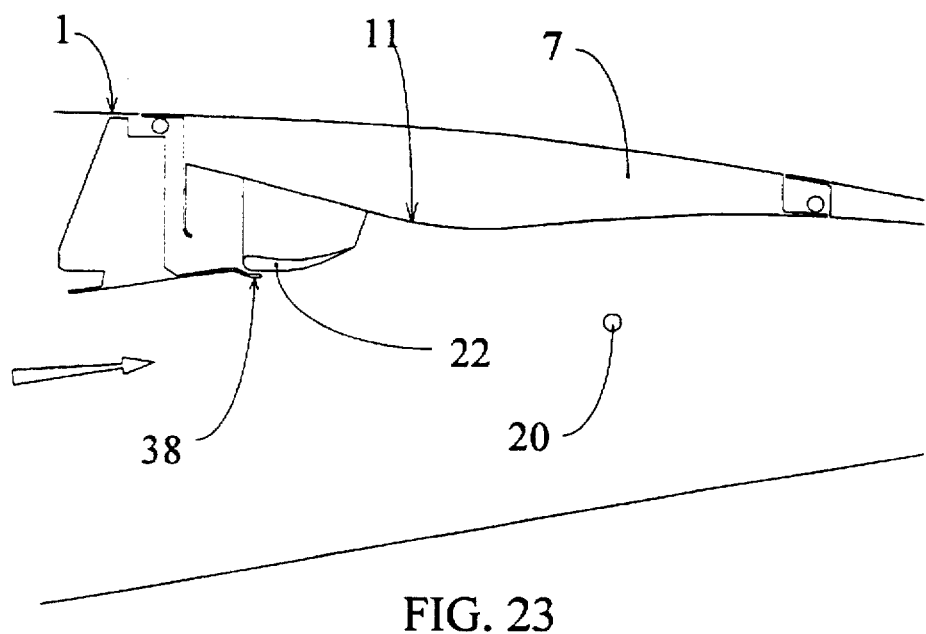
FIG. 23
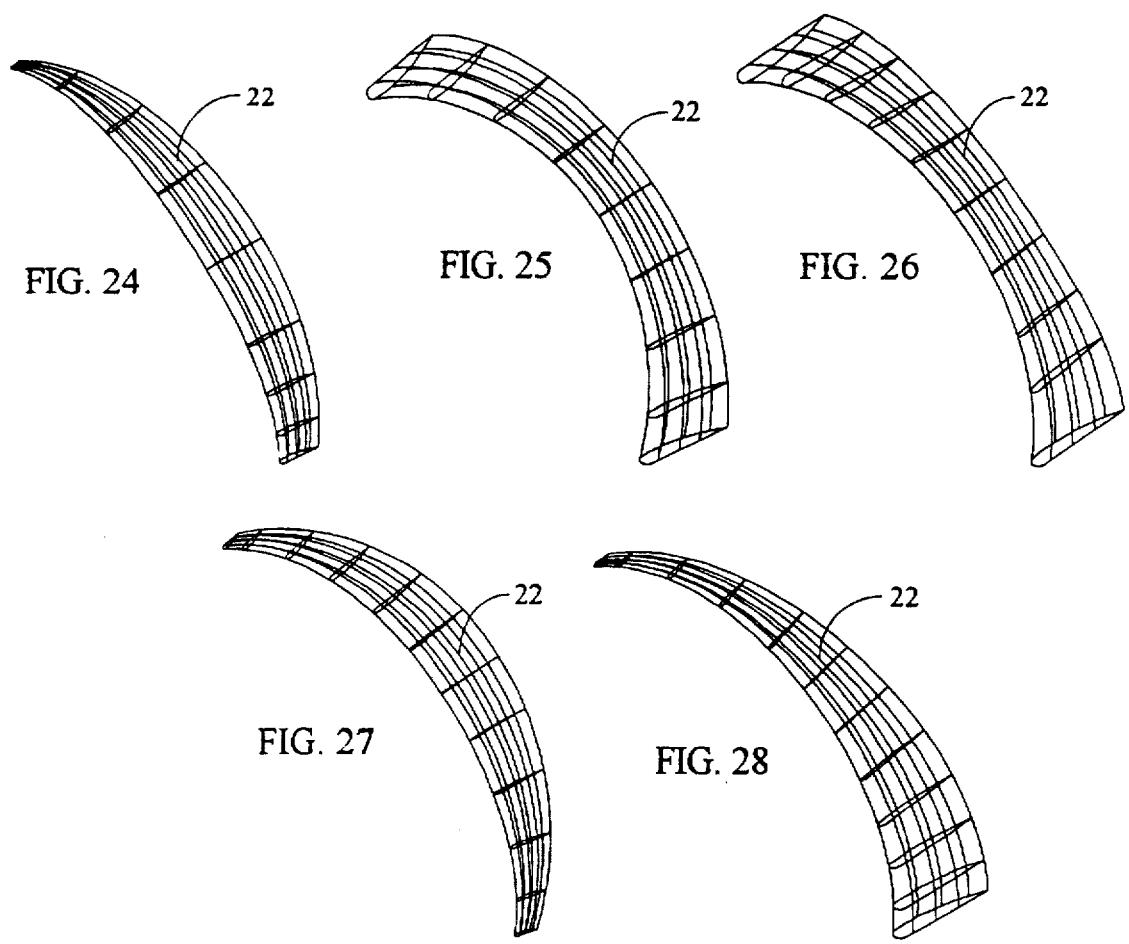
FIG. 24   FIG. 25   FIG. 26
FIG. 27   FIG. 28

5,893,265

1

PIVOTING DOOR THRUST REVERSER WITH DEFLECTING VANE

BACKGROUND OF THE INVENTION

The present invention relates to a pivoting door thrust reverser for a turbojet engine, more particularly a thrust reverser having a vane mounted on the pivoting thrust reverser door.

Turbofan-type turbojet engines are well known in the art and typically comprise a fan at the front of the turbojet engine which directs a flow of bypass air through a duct bounded by the engine cowling on the inside and a fan cowling on the outside. The generally annular duct bounded by the engine cowling and the fan cowling may channel both the bypass flow and the primary exhaust gas flow at a downstream portion or may channel only the bypass flow.

In aircraft on which the turbojet engine is mounted outside of the airframe structure, the fan cowling and the engine cowling are configured to form boundaries of the bypass flow duct and to provide aerodynamic outer surfaces to reduce drag.

FIGS. 1 and 2 illustrate a known pivoting door-type thrust reverser associated with the fan cowling of a turbofan-type turbojet engine. As illustrated in FIG. 1, the upstream portion of the fan cowling which defines the outer limits of the bypass flow duct and which is generally concentrically arranged about the turbojet engine (not shown) is designated as 1 and generally comprises an external cowling panel and an internal cowling panel interconnected by a frame 6. The outer surface of the external cowling panel has an aerodynamic surface over which the air external to the engine passes during aircraft flight. The inner surface of the inner cowling panel defines the outer boundary of the bypass flow duct through which the bypass air flow passes.

The fan cowling also comprises a thrust reverser, illustrated generally at 2, and a downstream fairing 3. The thrust reverser 2 comprises a door 7 pivotally attached to the cowling such that it is movable between a closed, forward thrust position, illustrated in FIG. 1, and an open, reverse thrust position in which the upstream end (towards the left as viewed in FIG. 1) of the thrust reverser door 7 is moved outwardly from the cowling, while a downstream portion is moved inwardly into the bypass flow duct airstream so as to redirect at least a portion of the bypass flow through an opening in the fan cowling in a direction that has a reverse thrust component.

An actuator 8 for moving the door 7 between its forward thrust and reverse thrust positions may comprise a hydraulic cylinder mounted to the frame 6, and having an extendible and retractable piston rod connected to the thrust reverser door 7.

The thrust reverser door 7 has an outer door panel 9 and an inner door panel 11 joined together by an internal structure. The upstream end of the door 7 may have a deflector 13 to maximize the efficiency of the thrust reverser when the door 7 is in the reverse thrust position. When the door is in the forward thrust position, as illustrated in FIG. 1, the outer door panel 9 is substantially flush with the external surfaces of the upstream panel and the downstream fairing 3.

As illustrated in FIG. 2, a plurality of thrust reverser doors 7 may be incorporated into the fan cowling, such doors being circumferentially spaced around the periphery of the fan cowling. A portion 18 of the fan cowling extends from an upstream portion 4 of the cowling axially between

2 adjacent thrust reverser doors 7 to provide structural rigidity to the fan cowling and to provide pivot mounting points for attaching the doors 7 to the fan cowling. French Patents 1,482,538 and 2,030,034 illustrate typical, known thrust reversers.

U.S. Pat. No. 3,605,411 discloses a pivoting door-type thrust reverser in which the deflector mounted on the upstream or forward end of the thrust reverser door is movable to an extended position when the door is in the reverse thrust position.

French Patent 2,618,853 discloses a thrust reverser in which the deflector is retracted when the door is in its forward thrust position to optimize engine performance.

In some applications, as illustrated in FIG. 1, the deflector 13 projects from the inner panel 11 of the thrust reverser door 7 even when the door is in its forward thrust position without extending into the bypass flow duct. This forms a cavity 16 facing inwardly into the bypass flow duct which will slightly degrade engine performance.

French Patent 2,680,547 discloses a thrust reverser having a combination of spoilers and deflectors to attempt to optimize the direction of exhaust flow.

The above-described known thrust reversers incur major drawbacks because of the aerodynamic size constraints on the flow passages cleared by the thrust reverser doors which cause the doors to be biased in the open, thrust reversing direction. The full cross-section of the flow passages must be larger than the associated duct cross-section in a plane taken upstream, or forward, of the door on account of the pressure losses due to the gas flow deflection since the downstream, or rearward portion of the duct unobstructed by the inwardly protruding portion of the thrust reverser doors is minimized in order to produce an appropriate reverse thrust force.

Quite obviously, the bias of the doors toward the open or reverse thrust position is a safety drawback. The reverser would be safer if the thrust reverser door was biased towards the closed or forward thrust position. This consideration also applies to a thrust reverser door that would tend to close again under pressure even if they were partially deployed towards the thrust reversing position.

In some cases, the effect of the pressure acting on the thrust reverser door is such that very high stresses are transmitted through the thrust reverser door actuators between their attachment points to the upstream portion of the cowling and the doors. As a consequence, this structure and the door locking mechanisms must be undesirably heavy.

SUMMARY OF THE INVENTION

The present invention relates to a thrust reverser for a turbojet engine having a cowling bounding a flow duct through which gases flow from the front of the cowling towards a rear of the cowling, the cowling having at least one reverse thrust opening communicating with the gas flow duct. The thrust reverser has a thrust reverser door pivotally mounted on the cowling so as to be movable between a forward and a thrust position, wherein the thrust reverser door covers the reverse thrust opening, and a reverse thrust position wherein the thrust reverser door uncovers the reverse thrust opening and directs at least a portion of the gases flowing through the gas flow duct outwardly through the reverse thrust opening. A vane having an air foil cross-sectional configuration is connected to the thrust reverser door and is located so as to be acted on by the gases passing through the gas flow duct when the thrust reverser door is adjacent to its forward thrust position, such that the vane exerts a force on the thrust reverser door urging it toward its forward thrust position.

The vane may be stationarily attached to the thrust reverser door, or may be attached to the door so as to be movable with respect to the door. A mechanical mechanism acting on the movable vane moves the vane away from the thrust reverser door as the door moves from its forward thrust position. Alternatively, the vane may be pivotally attached to the thrust reverser door so as to pivot about a vane pivot axis extending substantially parallel to the thrust reverser door pivot axis. The vane is pivoted as the thrust reverser door moves from its forward thrust position.

In all of the embodiments of this invention, the vane exerts a force on the door, when the thrust reverser door is adjacent to its forward thrust position, urging the door toward its forward thrust position. Thus, even if all of the known safety interlocks between the thrust reverser door and the cowling should malfunction, the forces acting on the door will urge it toward its forward thrust position, thereby preventing inadvertent opening of the thrust reverser door.

It is an objective of this invention to provide a pivoting door thrust reverser with increased safety and to improve the performance in both forward and reverse thrust positions.

BRIEF DESCRIPTION OF THE DRAWINGS

FIG. 23 is a view similar to FIG. 3, illustrating a variation of the embodiment illustrated in FIG. 3 with the thrust reverser door in the forward thrust position.

FIGS. 24-28 are schematic illustrations of vane configurations utilized with the thrust reverser according to the present invention.

DETAILED DESCRIPTION OF THE PREFERRED EMBODIMENTS

Figure 1:
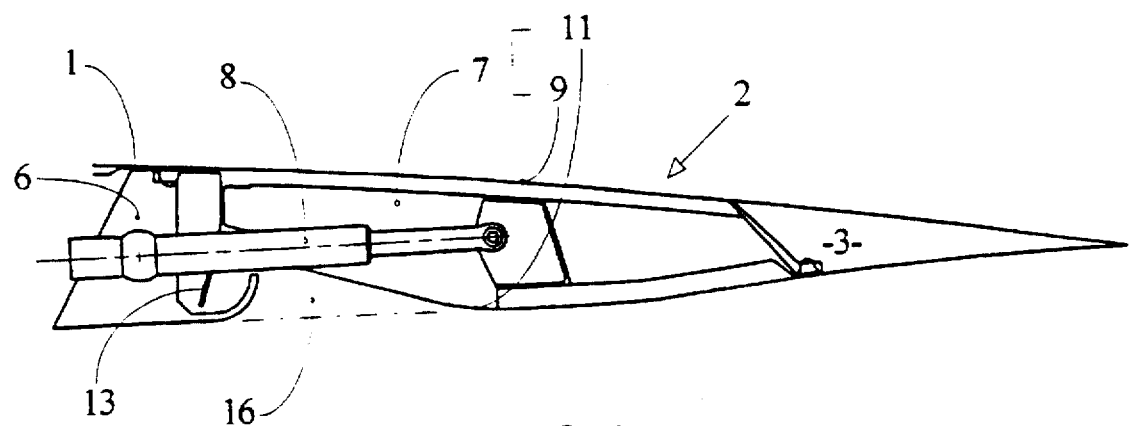
FIG. 1 is a partial, longitudinal cross-sectional view of a known type of pivoting door thrust reverser.
Figure 2:
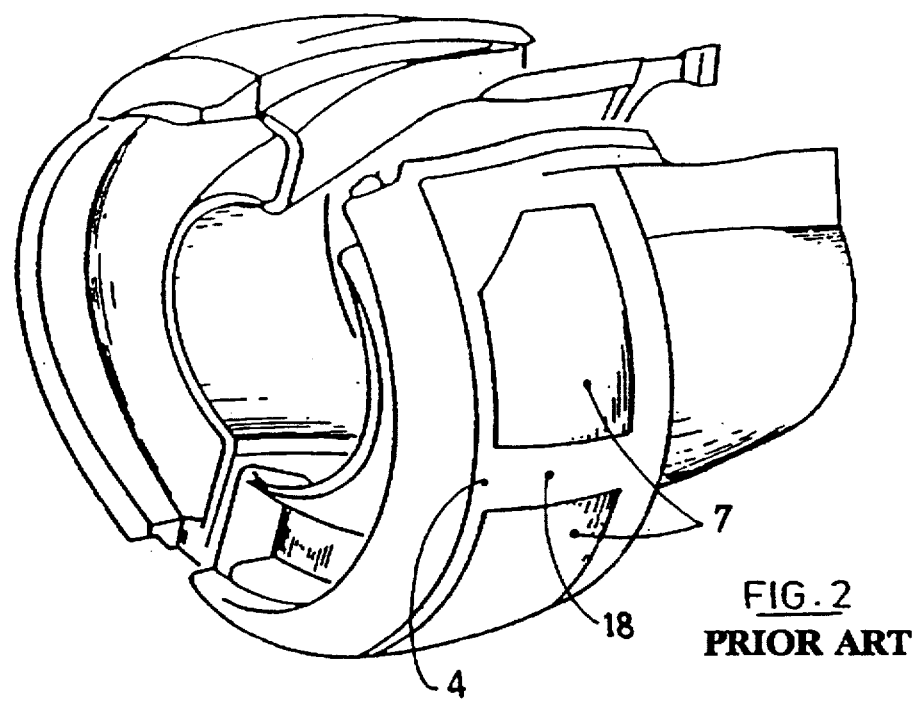
FIG. 2 is a perspective view of a turbojet engine cowling incorporating the known thrust reverser illustrated in FIG. 1.
Figure 3:
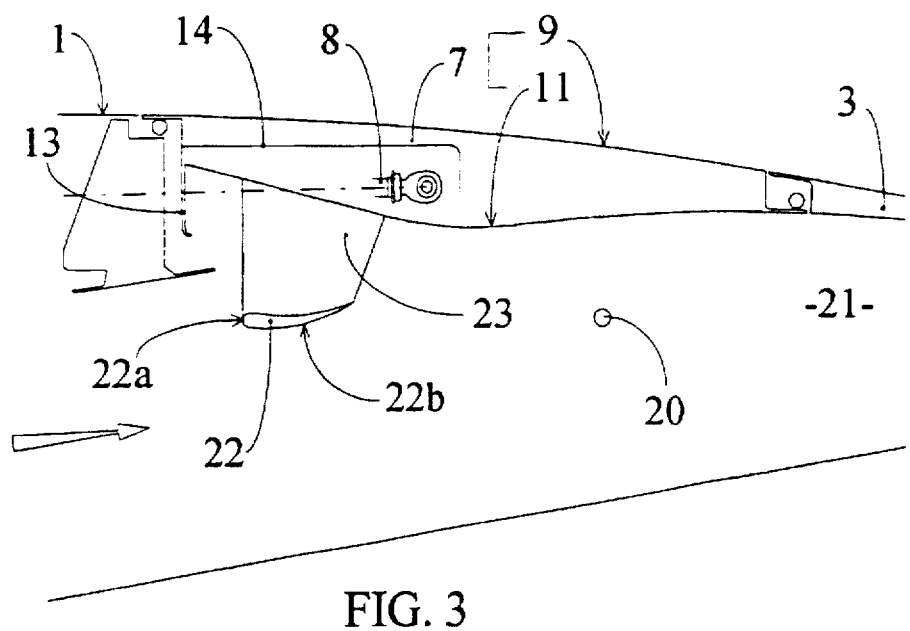
FIG. 3 is a partial, longitudinal, cross-sectional view of a first embodiment of the thrust reverser according to the present invention illustrating the thrust reverser door in the forward thrust position.
Figure 4:
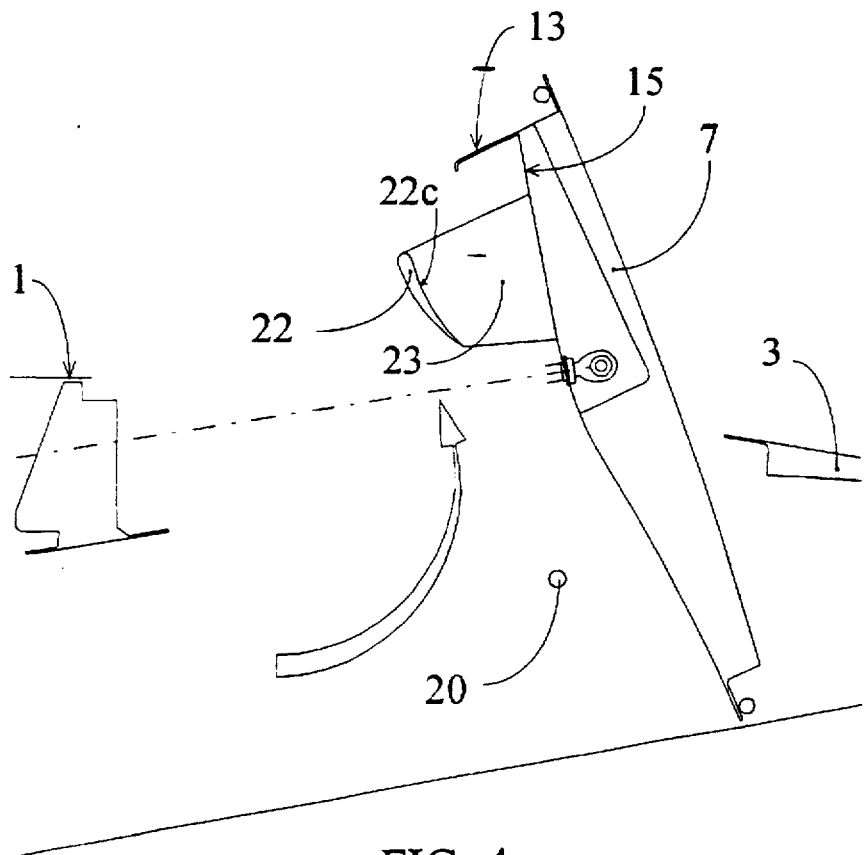
FIG. 4 is a cross-sectional view similar to FIG. 3, illustrating the thrust reverser door in the reverse thrust position.

A first embodiment of the invention is illustrated in FIGS. 3 and 4 in which components having the same or similar function to the known thrust reverser components illustrated in FIGS. 1 and 2 have been assigned the same identifying numbers. Thus, the thrust reverser according to the present invention is utilized with a fan cowling 1 have at least one reverse thrust opening therethrough which is covered by a pivoting thrust reverser door 7 when in the forward thrust position. As can be seen in FIG. 3, the thrust reverser door 7 when in the forward thrust position extends between the cowling 1 and a downstream fairing 3 to provide an aerodynamically smooth outer surface to the aircraft cowling. The thrust reverser door 7 has a forward deflector baffle 13 extending from a forward edge thereof, and comprises an outer door panel 9 and an inner door panel 11. An actuator 8 moves the thrust reverser door 7 between its forward thrust position, illustrated in FIG. 3, and its reverse thrust position, illustrated in FIG. 4. The thrust reverser door 7 is pivotally attached to the cowling 1 so as to pivot about a generally transverse door pivot axis 20. In known fashion, the door pivot axis 20 extends substantially perpendicular to a longitudinal axis of the cowling (not shown).

Figure 14:
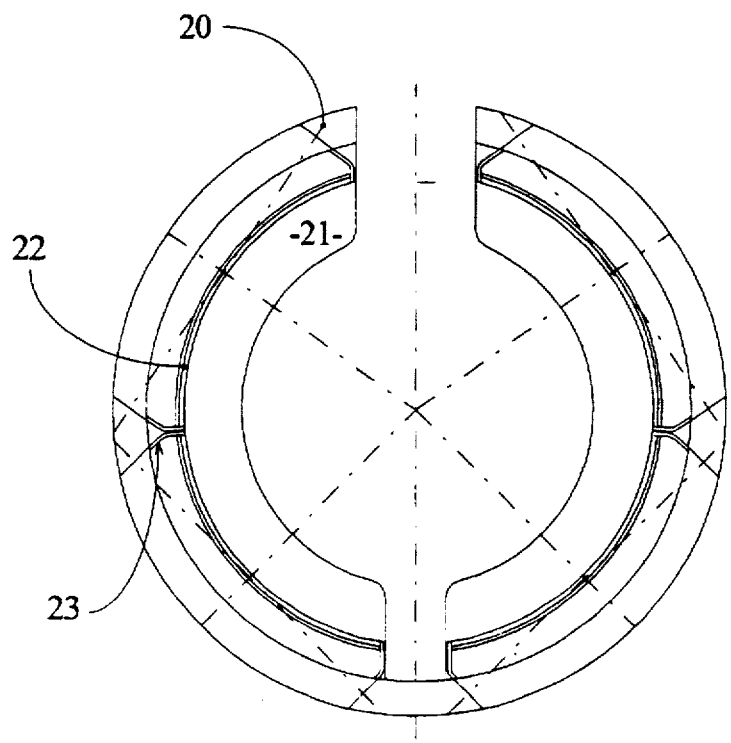
FIG. 14 is a front view of the thrust reverser illustrated in FIG. 3.
Figure 12:
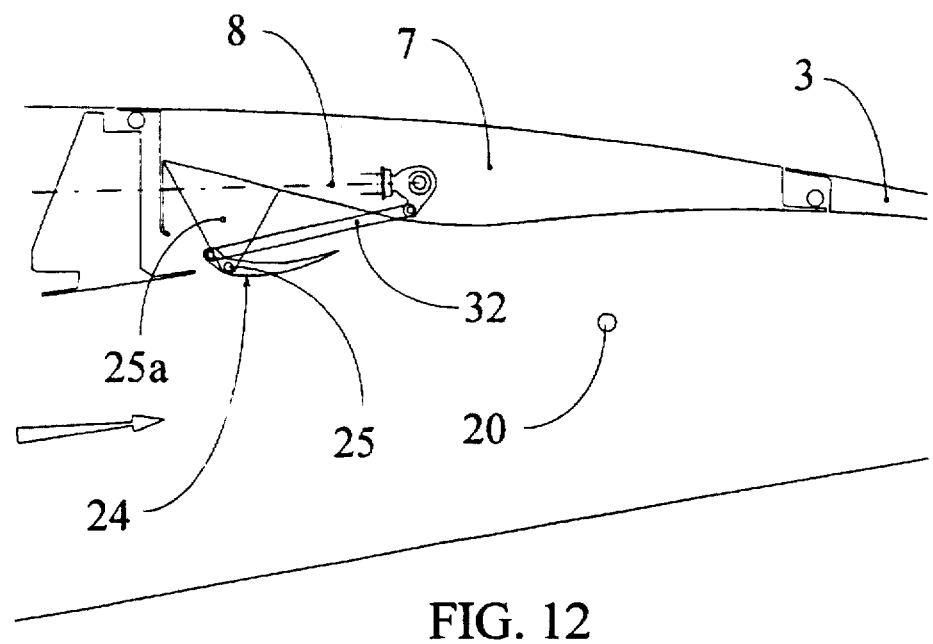
FIG. 12 is a view similar to FIG. 3, illustrating a sixth embodiment of the present invention with the thrust reverser door in the forward thrust position.
Figure 13:
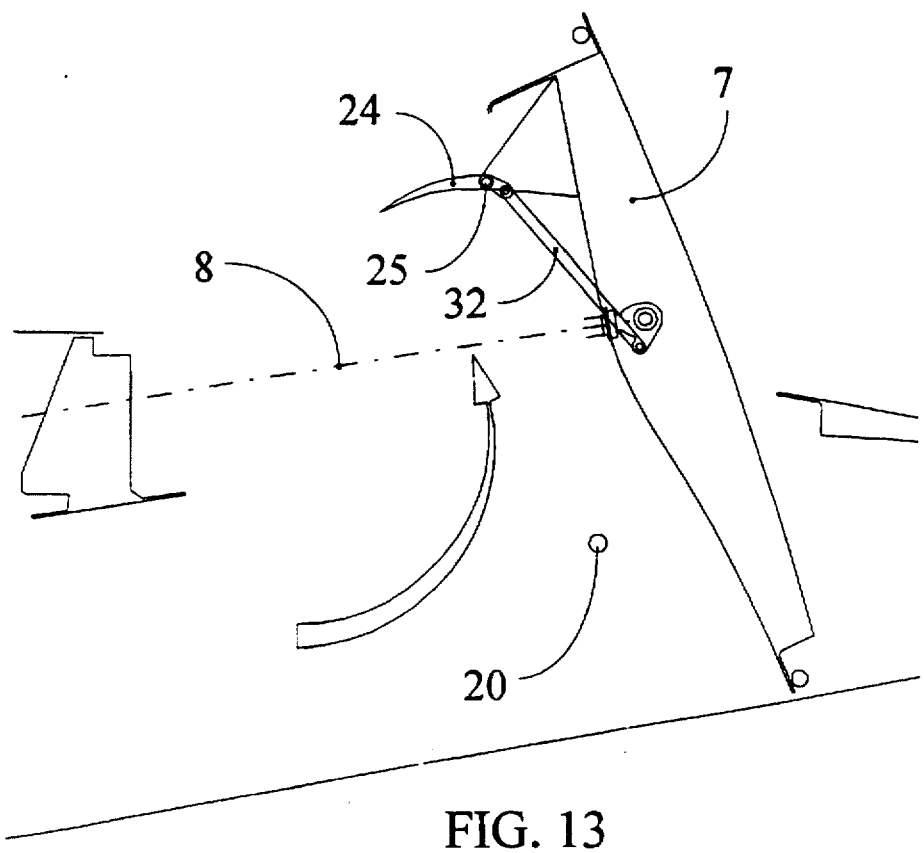
FIG. 13 is a view similar to FIG. 12, illustrating the thrust reverser door in the reverse thrust position.

In accordance with the features of the present invention, a vane 22 having an airfoil shaped cross-sectional configuration is attached to the thrust reverser door 7. In this particular embodiment, the vane 22 is attached to the thrust reverser door 7 by sidewalls 23 such that the vane 22 has an upstream or forward leading edge 22a and is located forwardly of the door pivot axis 20, between the door pivot axis 20 and the forward edge of the thrust reverser door 7. In known fashion, the airfoil configuration of the vane has a convexly curved, low pressure surface 22b, such that, when the air passing through the gas flow duct 21 passes over the vane 22, a force is generated which acts on the thrust reverser door 7 urging it toward its forward thrust position i.e. urging it in a counter clockwise direction about the pivot axis 20 as viewed in FIG. 3. In this embodiment, the vane 22 is located between an inner wall of the cowling 1, which forms the outer boundary of the gas flow duct 21 and an inner boundary of the gas flow duct. In this particular embodiment, the convex, low pressure side 22b of the vane 22 faces away from the thrust reverser door 7, while the convex, high pressure side 22c faces toward the thrust reverser door 7. The sidewalls 23 may have an aerodynamic cross-sectional configuration to minimize the disturbance of the gases flowing through the duct 21 and may be configured as illustrated in FIG. 14. This figure illustrates a configuration having four thrust reverser doors, each of which has a vane attached thereto by sidewalls 23.

The configuration of the vane 22, its particular length, shape and thickness, and its position on the door 7 coupled with its location in the duct 21 are such that the gas flow through the duct 21 biases the thrust reverser door 7 toward its forward thrust position when the door is in its forward thrust position, or slightly displaced therefrom towards its reverse thrust position. This insures that the thrust reverser door 7 will not be inadvertently deployed to its reverse thrust position even if all of the known mechanical, hydraulic, or electrical safety locks should malfunction.

In the reverse thrust position, as illustrated in FIG. 4, the high pressure side 22c of the vane 22 may assist in moving the gas flow toward the deflector baffle 13, thereby improving the flow of the reverse thrust gases toward the forward or upstream side of the cowling. The sidewalls 23 may also act as deflectors to assist in the control of the reverse thrust gas flow.

In the embodiment illustrated in FIGS. 3 and 4 in which the door actuator 8 is located in a recessed portion 14 on the inner surface of the thrust reverser door 7, the vane 22 may be comprised of two lateral portions located on each side of the recess 14. In the case wherein the control means is mounted outside of the reverse thrust opening, the vane 22 may extend circumferentially across the entire width of the associated thrust reverser door 7.

Figure 5:
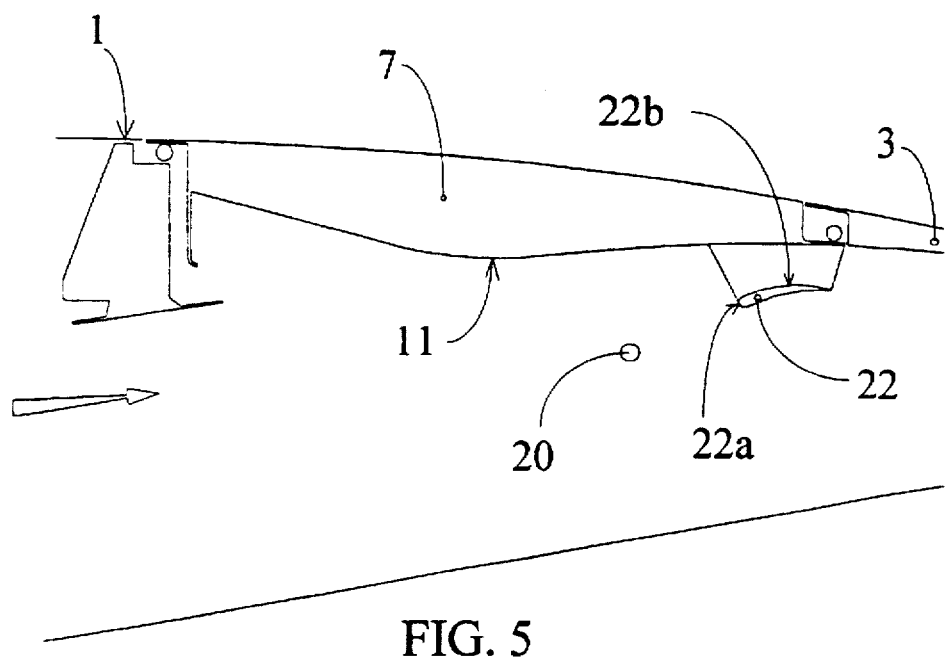
FIG. 5 is a view similar to FIG. 3, but illustrating a second embodiment of the thrust reverser according to the present invention.
Figure 6:
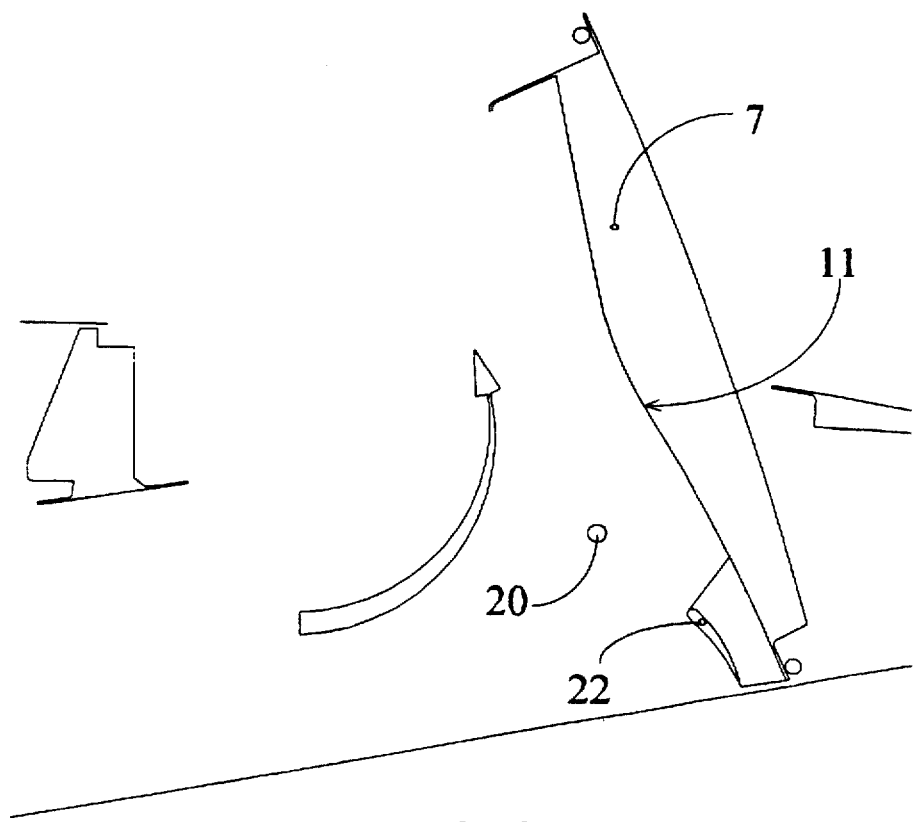
FIG. 6 is a view similar to FIG. 5, illustrating the thrust reverser door in the reverse thrust position.

A second embodiment of the invention is illustrated in FIGS. 5 and 6. In this embodiment, the vane 22 is located between the door pivot axis 20 and the downstream, or rearmost edge of the thrust reverser door 7 such that the leading edge 22a is located rearwardly of the door pivot axis 20. The low pressure surface 22b faces toward the thrust reverser door 7 such that the gases passing through the duct and acting on the vane 22 will exert a force on the thrust reverser door 7 urging it toward its forward thrust position, in a counter clockwise direction about pivot axis 120 as illustrated in FIG. 5. When the door 7 is in its reverse thrust position, as illustrated in FIG. 6, the vane 22 is located in a gas flow recirculation zone and does not significantly affect the reverse gas flow.

Figure 7:
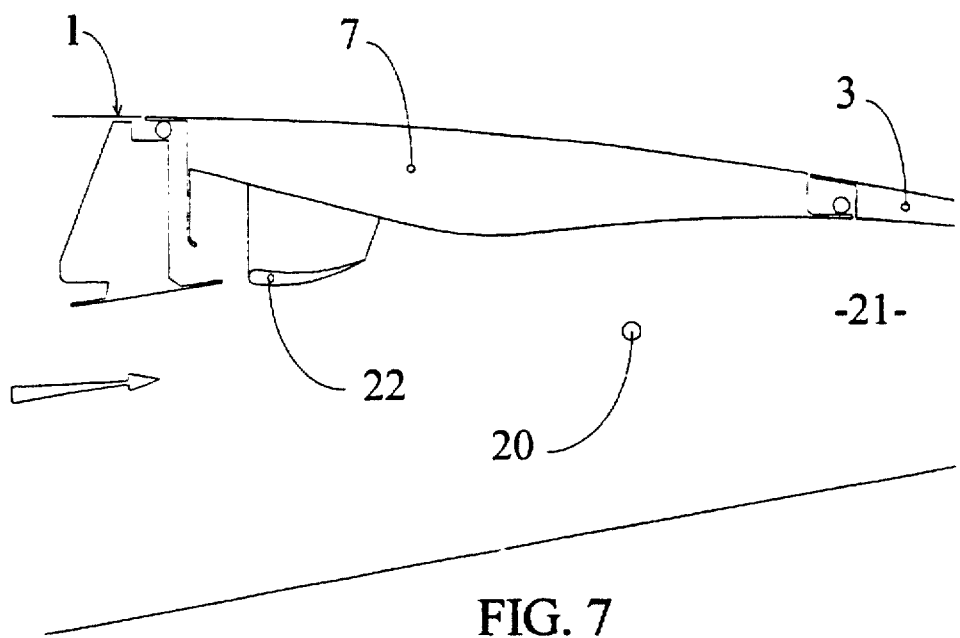
FIG. 7 is a view similar to FIG. 3, but illustrating a third embodiment of the thrust reverser door according to the present invention with the door in the forward thrust position.
Figure 8:
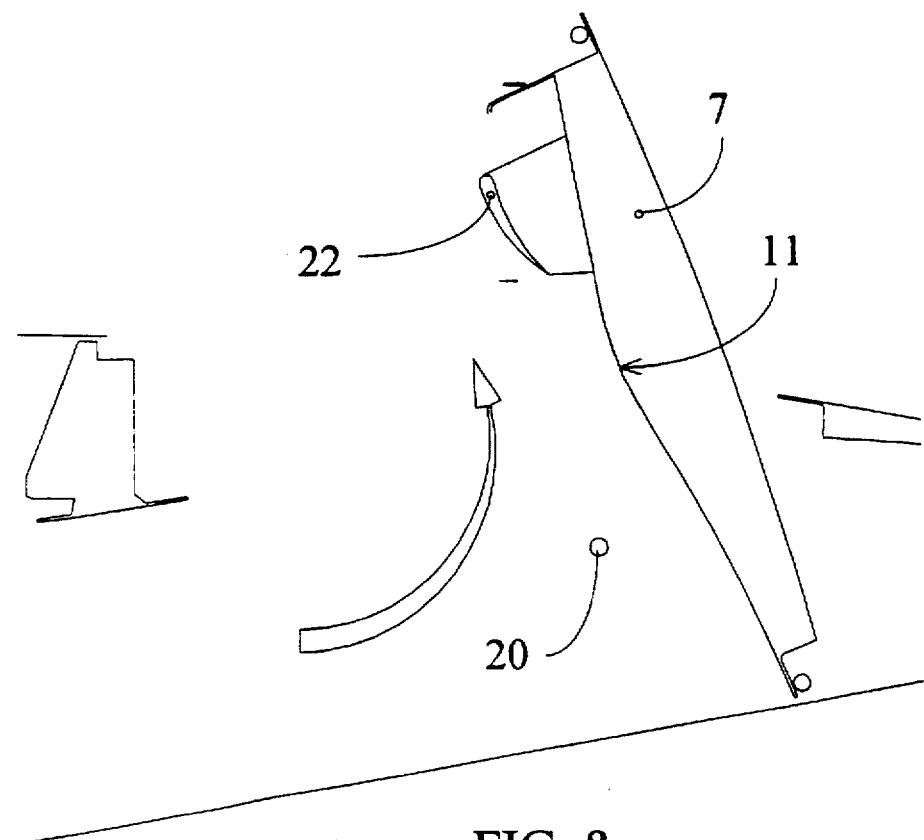
FIG. 8 is a view similar to FIG. 7, illustrating the thrust reverser door in the reverse thrust position.

FIGS. 7 and 8 illustrate a third embodiment of the invention which is similar to that illustrated in FIGS. 3 and 4, except that vane 22 is located at the outer limit of the gas flow through the duct 21 near the boundary wall of the cowling 1 and the inner wall 11 of the thrust reverser door 7. In this position, the gases flowing through the duct 21 act on the convex, low pressure surface of the vane 22 to exert a force on the thrust reverser door 7 urging it toward its forward thrust position when the thrust reverser door 7 is in its forward thrust position, or slightly displaced therefrom. In a variation of this embodiment, the forwarding leading edge of the vane 22 may be placed on the downstream side of the pivot axis 20 to improve reverse flow guidance of the gases on the inner wall of the thrust reverser door 7 when it is in its reverse thrust position.

Another variation of this embodiment is illustrated in FIG. 23 wherein it can be seen that the inner wall of the cowing 1 bounding the gas flow duct 21 comprises a deflection edge 38 which slightly overlaps of the leading portion of the vane 22 to improve the negative pressure effect in the cavity of the thrust reverser door 7 when it is in its forward thrust position.

Figure 9:
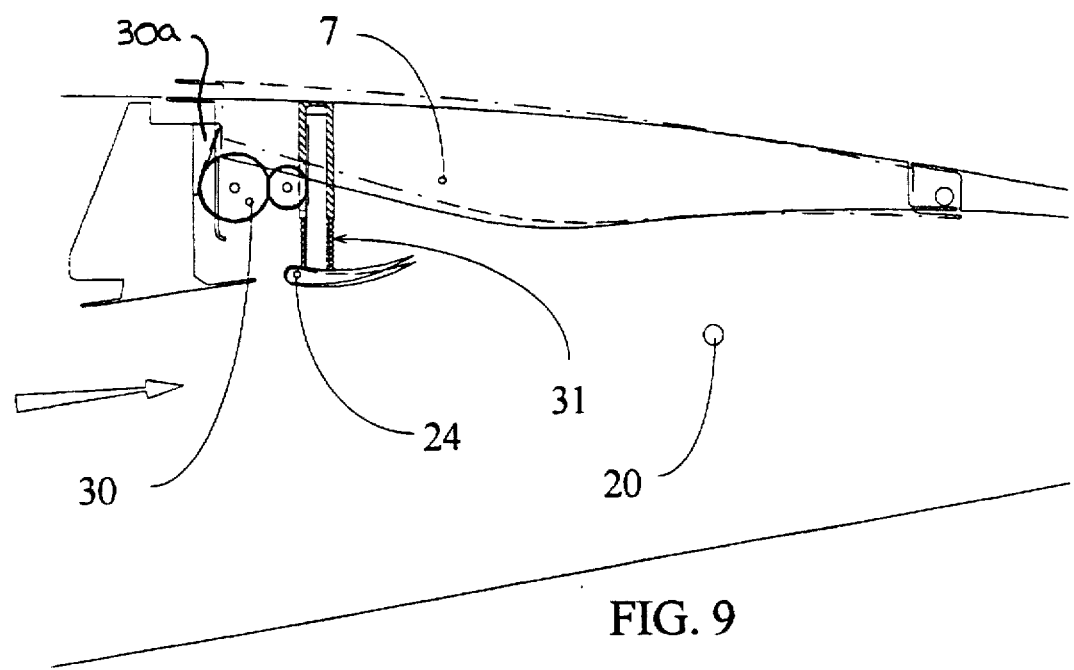
FIG. 9 is a view similar to FIG. 3, illustrating a fourth embodiment of the thrust reverser according to the present invention with the thrust reverser door in the forward thrust position.
Figure 10:
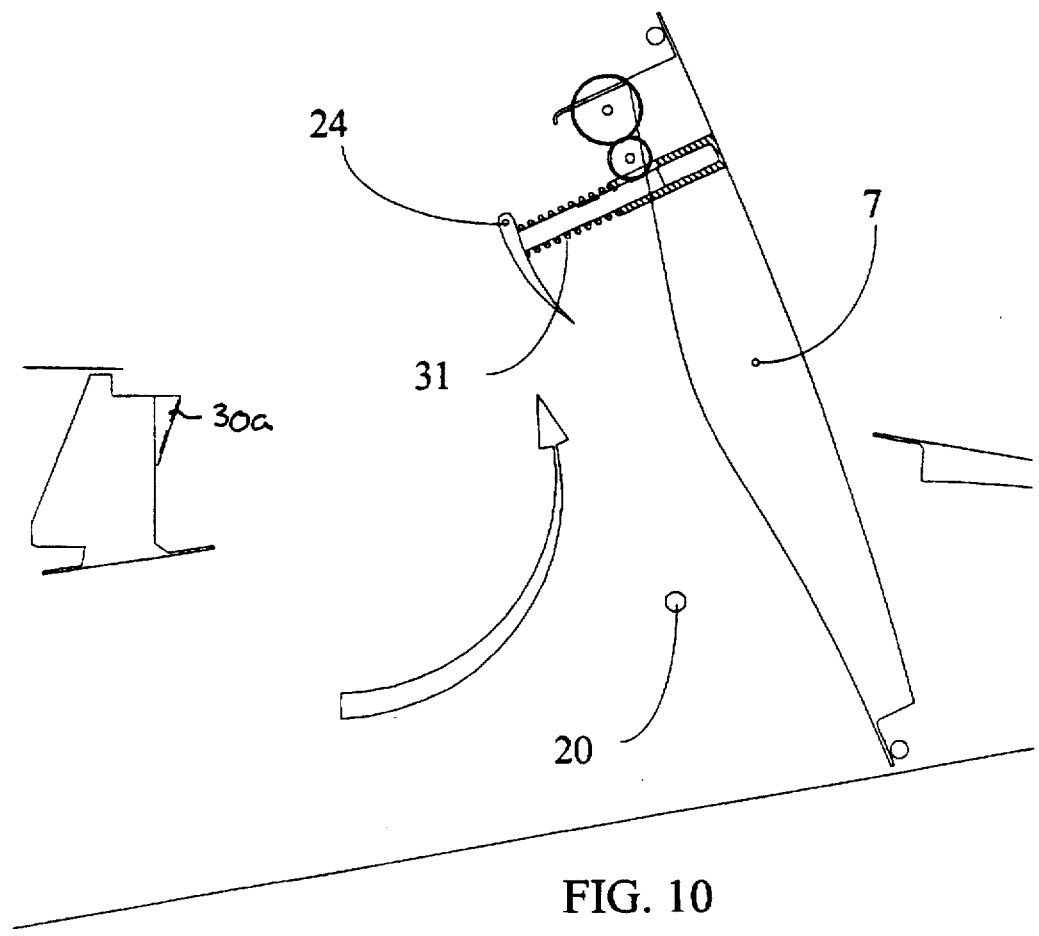
FIG. 10 is a view similar to FIG. 9, illustrating the thrust reverser door in the reverse thrust position.

In all of the aforementioned embodiments, the vane 22 is fixedly attached to the thrust reverser door 7. The invention also encompasses the concept of the movably mounting the vane 22 to the thrust reverser door 7. One embodiment of this movably mounted vane is illustrated in FIGS. 9 and 10 wherein it can be seen that the vane 24 is attached to a mechanical system 30 which enables the vane 24 to be moved away from the thrust reverser door 7 as the thrust reverser door 7 moves away from its forward thrust position. In this particular case, the mechanical system 30 comprises a rack and pinion type of assembly comprising a gear rack attached to the vane 24 and slidably mounted on the thrust reverser door 7. A pinion gear assembly engages the gear rack, as well as a portion of the cowling 1, illustrated at 30a, such that movement of the thrust reverser door 7 from its forward thrust position toward its reverse thrust position will cause rotation of the pinion gear system which, in turn, cause axial movement of the gear rack such that the vane 24 is moved in a direction away from the thrust reverser door 7. A spring 31 may be interposed between the vane and the thrust reverser door so as to urge the vane 24 in a direction away from the thrust reverser door 7. As soon as the thrust reverser door 7 is displaced from its forward thrust position, the vane 22 moves away from the door further into the gas stream flowing through the gas flow duct and exerts a force on the thrust reverser door 7 urging it back toward its forward thrust position.

Figure 11:
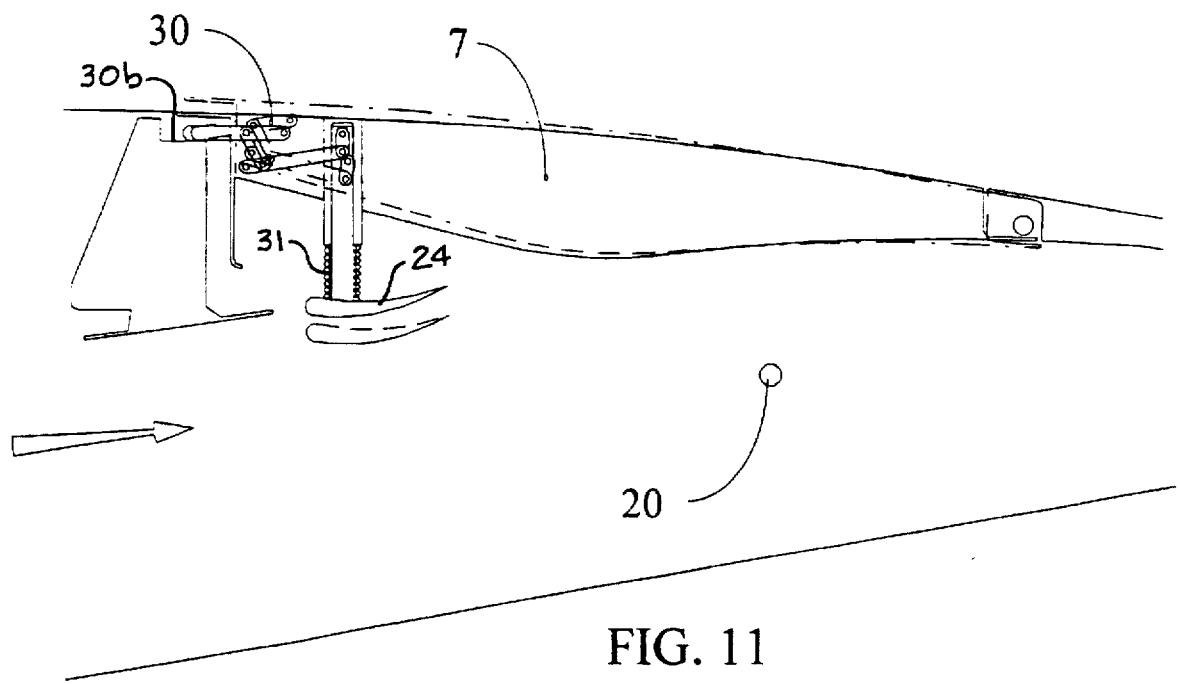
FIG. 11 is a view similar to FIG. 3, illustrating a fifth embodiment of the thrust reverser according to the present invention with the thrust reverser door in the forward thrust position.

The mechanical system actuating the vane movement may also comprise a series of linkrods, as illustrated in FIG. 11. In this embodiment, the vane 24 is attached to the thrust reverser door 7 via an element slidably mounted in the door 7. The element is connected to a series of linkrods located such that one of the linkrods bears against a portion 30b of the cowling 1 when the door is in its forward thrust position so as to move the vane 24 towards the door. As the thrust reverser door 7 is displaced from its forward thrust position, the linkrod moves out of contact with the cowling 1 thereby enabling a spring 31 acting on the vane 24 to move the vane away from the thrust reverser door 7 and further into the gas flow passing through the annular duct. The gases acting on the vane 24 will then exert a force on the door 7 urging it toward its forward thrust position.

The invention also encompasses the concept of pivotally attaching the vane to the thrust reverser door 7 as illustrated in the embodiments shown in FIGS. 12 and 13, and FIGS. 15 and 16. In the embodiment illustrated in FIGS. 12 and 13, a vane 24 is pivotally attached to support 25a so as to pivot about a vane pivot axis 25. A linkrod 32 connects a forward edge of the vane 24 to a connector attaching the end of the actuator piston rod to the thrust reverser door 7. As the door moves from its forward thrust position to its reverse thrust position, illustrated in FIG. 13, the vane 24 will pivot about the vane pivot axis 25 to the position illustrated in FIG. 13. In this reverse thrust position, the vane 24 acts on the reverse thrust gas flow directing it in an upstream or forward direction to provide a more efficient reverse thrust force. The vane pivot axis 25 extends substantially parallel to the door pivot axis 20.

Figure 15:
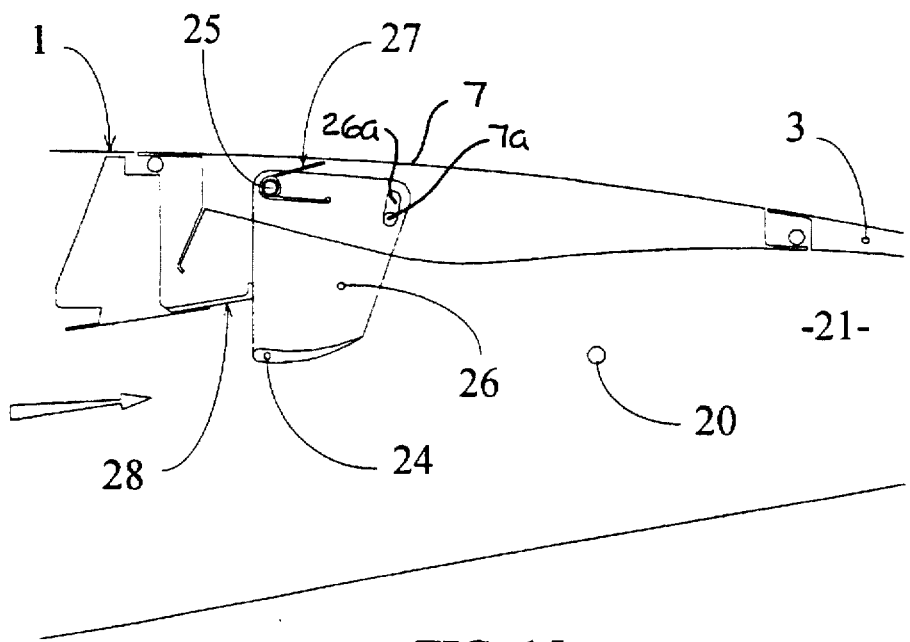
FIG. 15 is a view similar to FIG. 3, illustrating a seventh embodiment of the thrust reverser according to the present invention with the thrust reverser door in the forward thrust position.
Figure 16:
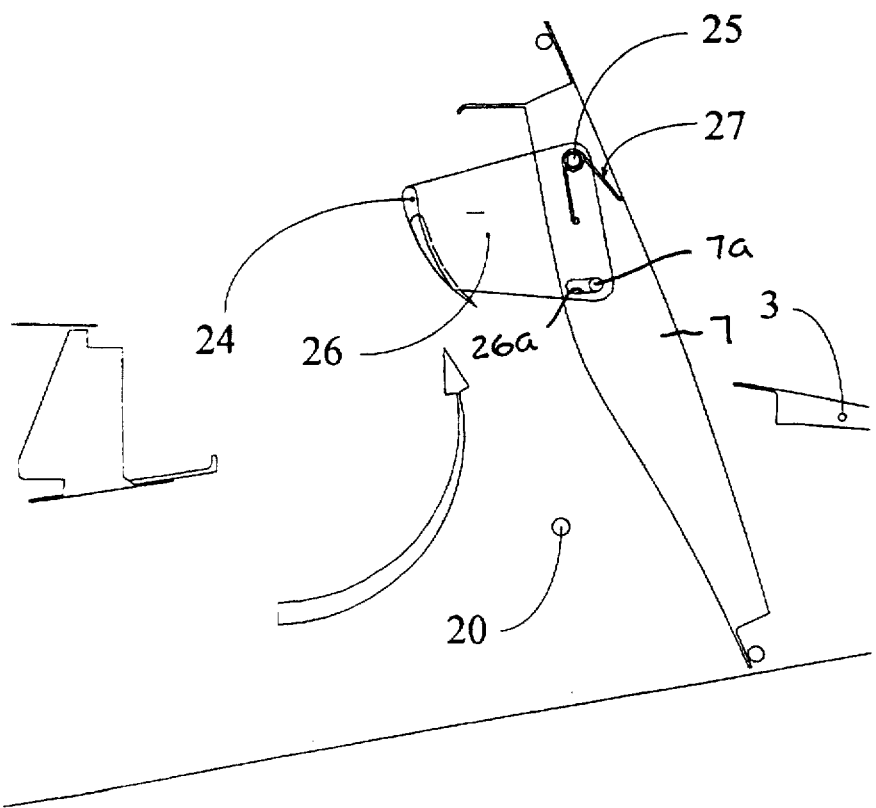
FIG. 16 is a view similar to FIG. 15, illustrating the thrust reverser door in the reverse thrust position.

In the embodiment illustrated in FIGS. 15 and 16, the vane 24 is fixedly attached to sidewalls 26 which are, in turn, pivotally attached to the thrust reverser door 7 so as to pivot about vane pivot axis 25. A pin 7a extends through an elongated slot 26a in the sidewalls 26 so as to limit the pivoting movement of the vane 24. A torsion spring 27 has a first arm bearing against a portion of the thrust reverser door 7 and a second arm engaged with the sidewall 26 such that the vane 24 and sidewalls 26 are pivoted with respect to the thrust reverer door 7 as the door 7 moves from its forward thrust position, illustrated in FIG. 15, to its reverse thrust position, illustrated in FIG. 16. In the forward thrust position, the sidewall 26 bears against a stop 28 extending from the cowling 1 so as to overcome the force of the torsion spring 27 and urge the vane 24 toward a first position. As the thrust reverser door 7 pivots toward its reverse thrust position, the sidewalls 26 move out of contact with the stop 28 enabling the torsion spring 27 to pivot the vane 24 toward its second position. In the reverse thrust position, optimal control of the reverse thrust gas flow is achieved by properly positioning the vane 24 with respect to the inner portion of the thrust reverser door 27.

Figure 17:
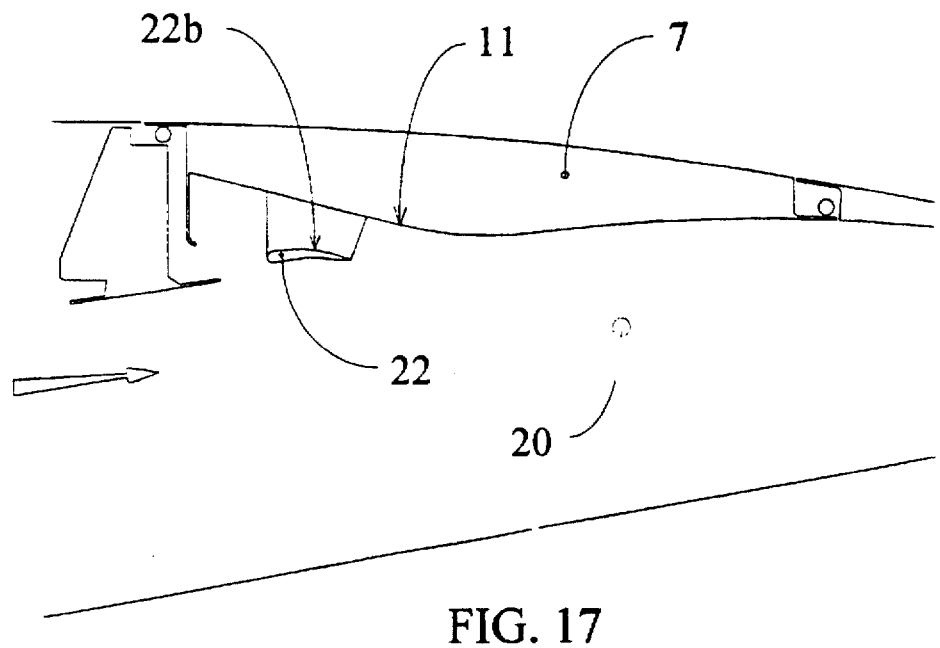
FIG. 17 is a view similar to FIG. 7, illustrating a variation of the embodiment illustrated in FIG. 7 with the thrust reverser door in the forward thrust position.
Figure 18:
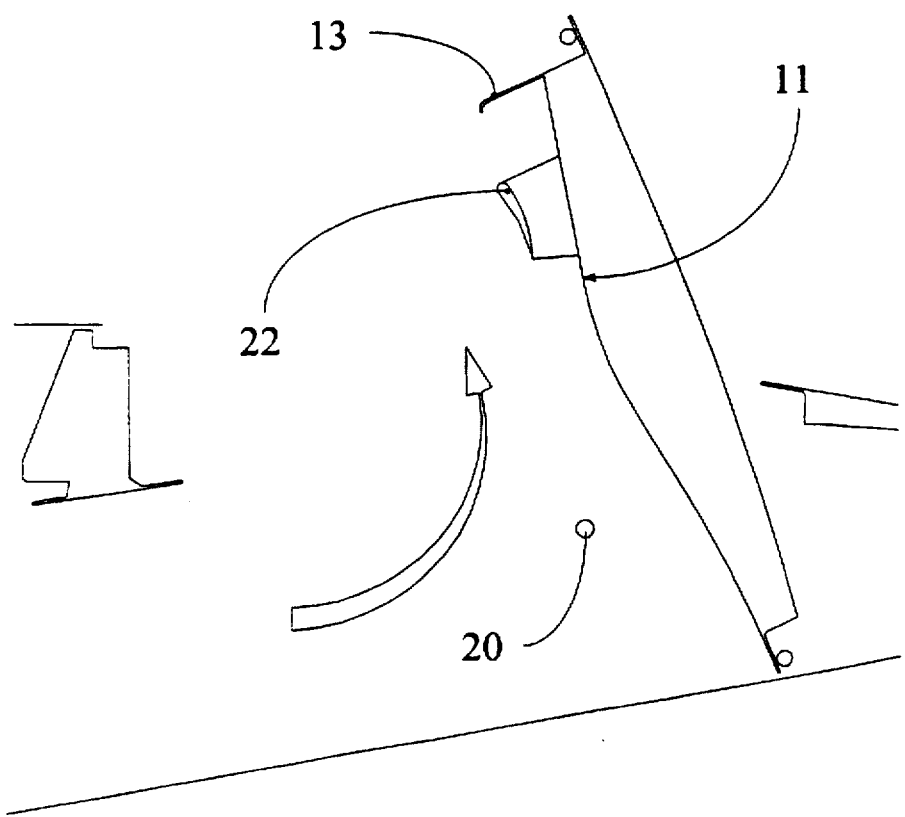
FIG. 18 is a view similar to FIG. 17, illustrating the thrust reverser door in the reverse thrust position.

FIGS. 17 and 18 illustrate an embodiment wherein the fixed vane 22 is located in a cavity formed by the inner wall 11 of the thrust reverser door 7, and the inner wall of the cowling 1 forming the outer boundary of the gas flow duct. In this location, the convex, low pressure surface 22b of the vane 22 faces toward the thrust reverser door 7 and the leading edge 22a of the vane 22 is located upstream of the door pivot axis 20. When the thrust reverser door 7 is in its reverse thrust position, as illustrated in FIG. 18, the vane 22 will channel a portion of the reverse gas flow toward the deflector baffle 13 so as to improve the efficiency of the thrust reverser and to insure the desired thrust reversal performance. Since the vane 22 is located in cavity when the thrust reverser door 7 is in its forward thrust position, it is out of the flow of gases passing through the duct and, therefore, does not exert an opening force on the thrust reverser door 7. Alternatively, the leading edge 22a of the vane 22 may be located on a downstream, or rearward portion of the vane.

Figure 19:
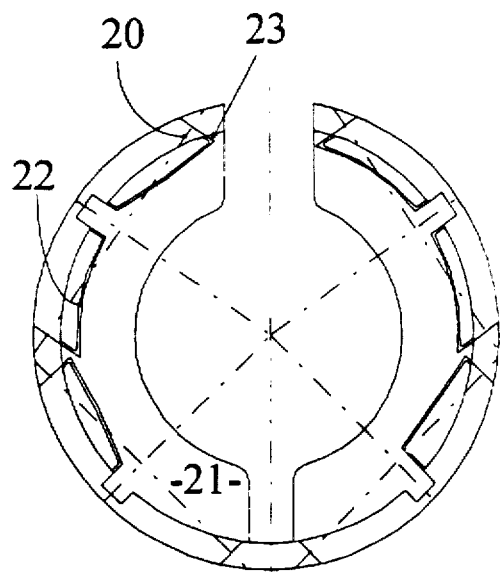
FIGS. 19-22 are transverse cross-sectional views illustrating various configurations of the vanes utilized with the present invention.
Figure 20:
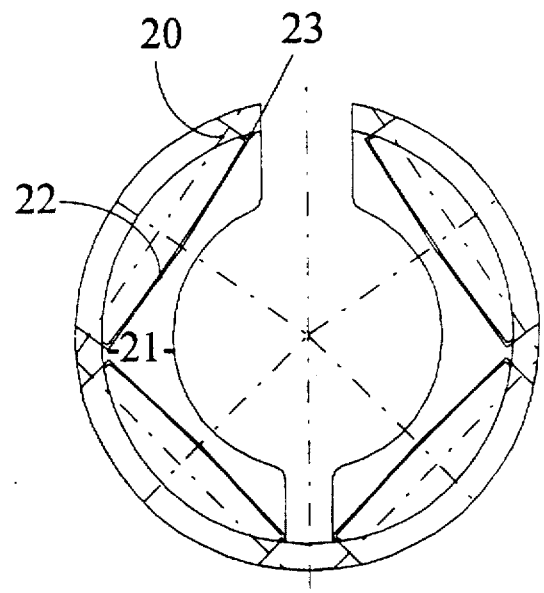
Figure 21:
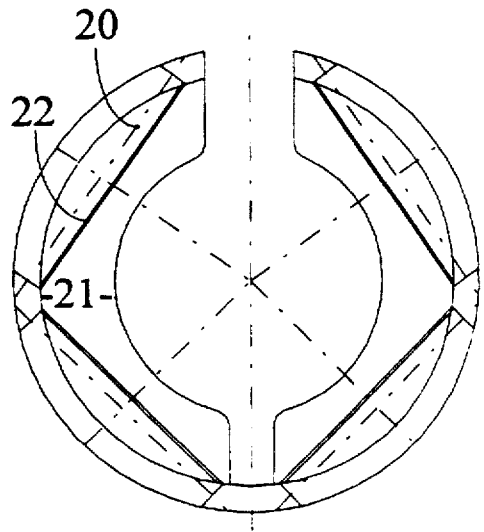

Depending upon the particular application the control of the reverse thrust gas flow may be controlled and optimized by use of the vanes. The curvature of the vanes in a circumferential direction of the cowling may be controlled such that the radially innermost surface (that surface facing away from the thrust reverser door 7) is concave, as illustrated in FIG. 19, convex, as illustrated in FIG. 20, or straight, as illustrated in FIG. 21. Also, the lengths of the sidewalls 23 may be varied as in FIG. 22. Obviously, these specific features may be utilized individually or may be combined in any given application.

Figure 22:
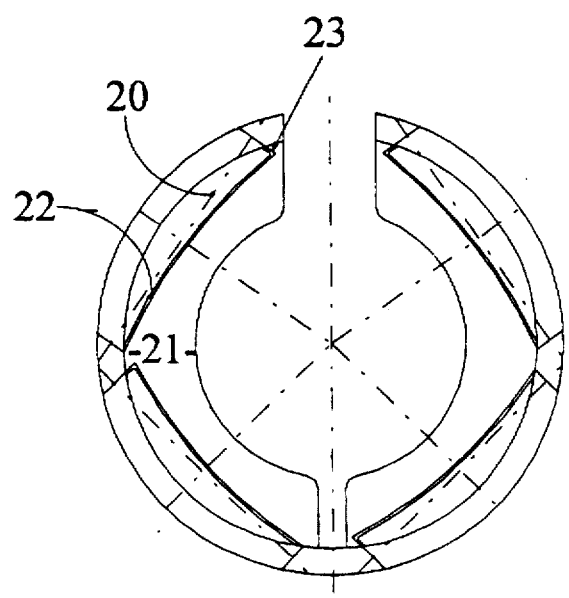

The vane may circumferentially extend across the entire lateral width of the door 7, as illustrated in FIG. 20 or may extend only partially across the width of the thrust reverser door 7, as illustrated in FIG. 19. Also, the vane may be oriented asymmetrically with respect to the longitudinal axis of the cowling, as illustrated in FIG. 22.

The direction of the reverse thrust gas flow may also be controlled by the configuration of the leading and trailing edges of the vane as illustrated schematically in FIGS. 24-28. The leading and trailing edges may be parallel, or may be oriented obliquely with respect to each other, or may have different curvatures dependent upon the desired reverse thrust gas flow in a given application.

Although the embodiments have been described using only one vane per thrust reverser door, it is within the scope of the present invention to associate more than one vane with a given thrust reverser door.

Figure 29:
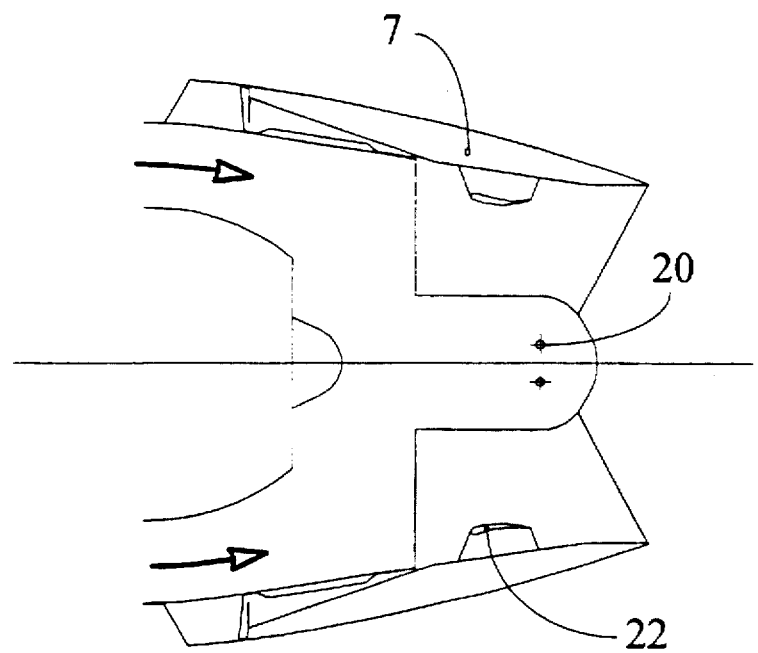
FIG. 29 is a longitudinal, cross-sectional view illustrating another embodiment of the thrust reverser according to the present invention with the thrust reverser doors in their forward thrust positions.
Figure 30:
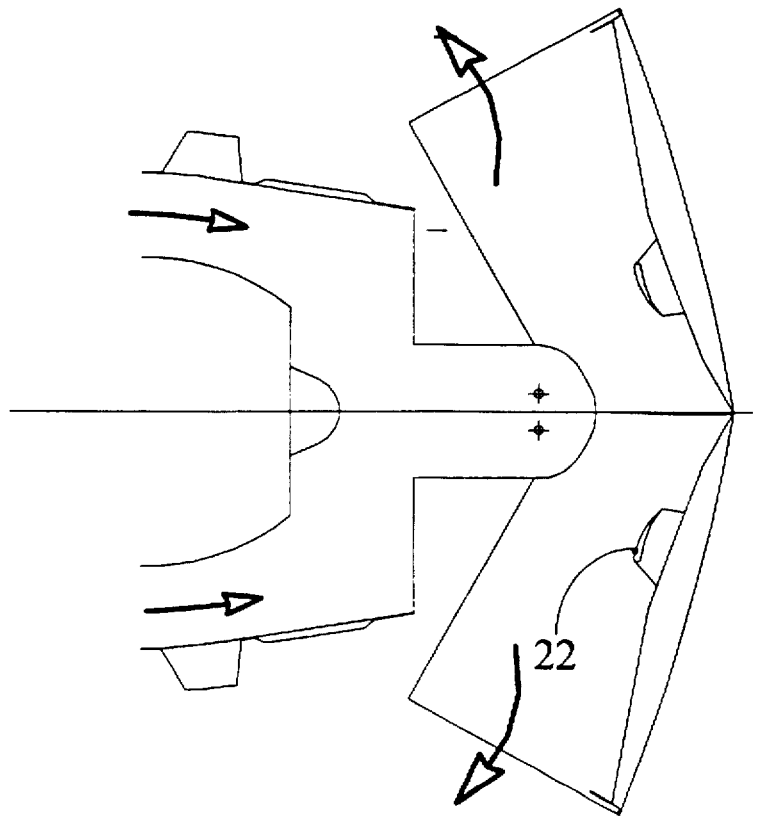
FIG. 30 is a view similar to FIG. 29, illustrating the thrust reverser doors in their reverse thrust positions.

The concepts of the present invention may also be employed with a pivoting door thrust reverser mounted on the rearmost portion of a gas flow duct, as illustrated in FIGS. 29 and 30. In this embodiment, vanes 22 are utilized with thrust reverser doors 7 which, when in the forward thrust position, form a downstream end of a gas flow duct. Each of the doors 7 are pivotable about a door pivot axis 20 into the positions illustrated in FIG. 30 so as to redirect the flow of gases emanating from the duct into a reverse thrust flow. The configurations of the vane 22 previously described may be associated with one or both of the thrust reverser door 7. In this particular application, the vanes 22 may also assume the function of protecting the thrust reverser doors from the direct impingement of the hot gases when in the thrust reverse position.

The foregoing descriptions are provided for illustrative purposes only and should note be construed as in any way limiting this invention, the scope of which is defined solely by the appended claims.

We claim:

1. A thrust reverser for a turbojet engine having a cowling bounding a gas flow duct through which gases flow from a front towards a rear, the cowling having at least one reverse thrust opening communicating with the gas flow duct, wherein the thrust reverser comprises:
   a) a thrust reverser door pivotally mounted on the cowling so as to be movable between a forward thrust position wherein the thrust reverser door covers the at least one reverse thrust opening and a reverse thrust position wherein the thrust reverser door uncovers the at least one reverse thrust opening and directs at least a portion of the gases flowing through the gas flow duct through the at least one reverse thrust opening; and,
   b) a vane having an airfoil cross-sectional configuration connected to the thrust reverser door so as to be acted on by the gases flowing through the gas flow duct when the thrust reverser door is adjacent to its forward thrust position such that the vane exerts a force on the thrust reverser door urging it toward its forward thrust position.

2. The thrust reverser of claim 1 wherein the gas flow duct has a longitudinal axis extending substantially in the direction of the gas flow through the gas flow duct and wherein the thrust reverser door pivots about a door pivot axis extending substantially perpendicular to the longitudinal axis.

3. The thrust reverser of claim 2 wherein the vane is located forward of the pivot axis.

4. The thrust reverser of claim 3 wherein the vane is located between a forward end of the thrust reverser door and the pivot axis.

5. The thrust reverser of claim 2 wherein the vane is located rearward of the pivot axis.

6. The thrust reverser of claim 5 wherein the vane is located between a rear end of the thrust reverser door and the pivot axis.

7. The thrust reverser of claim 1 wherein the gas flow duct has an inner boundary and wherein the vane is located in the gas flow between the inner boundary and the cowling.

8. The thrust reverser of claim 1 wherein the vane is connected to the thrust reverser door by sidewalls.

9. The thrust reverser of claim 8 wherein the sidewalls having aerodynamic cross-sectional configurations.

10. The thrust reverser of claim 1 further comprising a deflection edge on the cowling located on a forward side of the at least one reverse thrust opening such that at least a portion of the deflection edge overlaps a forward portion of the vane.

11. The thrust reverser of claim 1 wherein the vane is movable with respect to the thrust reverser door.

12. The thrust reverser of claim 11 further comprising a mechanical mechanism connecting the vane to the thrust reverser door such that the vane is moved away from the thrust reverser door when the thrust reverser door is displaced from its forward thrust position.

13. The thrust reverser of claim 12 wherein the mechanical mechanism comprises:
   a) a gear rack connected to the vane and slidably mounted on the thrust reverser door; and,
   b) a pinion gear set engaging the gear rack and in contact with the cowling such that, as the thrust reverser door is displaced from the forward thrust position the vane is moved away from the thrust reverser door.

14. The thrust reverser of claim 13 is further comprising a spring acting on the vane urging the vane away from the thrust reverser door.

15. The thrust reverser of claim 12 wherein the mechanical mechanism comprises:
   a) an attachment member movably attaching the vane to the thrust reverser door;
   b) a spring acting on the vane so as to bias the vane away from the thrust reverser door; and,
   c) a link rod assembly connected to the attachment member and located so as to contact the cowling when the thrust reverser door is adjacent to its forward thrust position so as to move the vane towards the thrust reverser door.

16. The thrust reverser of claim 11 wherein the vane is pivotally attached to the thrust reverser door so as to pivot with respect to the thrust reverser door about a vane pivot axis.

17. The thrust reverser of claim 16 further comprising a linkrod pivotally connected to the vane and to a door actuator which moves the thrust reverser door between its forward and reverse thrust positions.

18. The thrust reverser of claim 16 further comprising a support wall connected to the vane and pivotally connected to the thrust reverser door such that the vane is movable between two extreme positions.

19. The thrust reverser of claim 18 further comprising a spring acting on the support wall so as to bias the vane toward one of the two extreme positions.

20. The thrust reverser of claim 1 wherein the airfoil configuration of the vane comprises a convexly curved low pressure surface facing towards the thrust reverser door.

21. The thrust reverser of claim 1 wherein the airfoil configuration of the vane comprises a convexly curved low pressure surface facing away from the thrust reverser door.

* * * * *